United States Patent
Erkin et al.

(10) Patent No.: US 10,686,861 B2
(45) Date of Patent: Jun. 16, 2020

(54) LIVE STREAM CONNECTOR

(71) Applicant: Google LLC, Mountain View, CA (US)

(72) Inventors: Beril Erkin, Mountain View, CA (US); Oztan Harmanci, Mountain View, CA (US); Ismail Haritaoglu, Mountain View, CA (US)

(73) Assignee: Google LLC, Mountain View, CA (US)

( * ) Notice: Subject to any disclaimer, the term of this patent is extended or adjusted under 35 U.S.C. 154(b) by 65 days.

(21) Appl. No.: 16/149,835

(22) Filed: Oct. 2, 2018

(65) Prior Publication Data

US 2020/0106824 A1    Apr. 2, 2020

(51) Int. Cl.
| | |
|---|---|
| *H04L 29/06* | (2006.01) |
| *H04L 1/16* | (2006.01) |
| *H04L 12/26* | (2006.01) |
| *H04L 1/18* | (2006.01) |

(52) U.S. Cl.
CPC ........... *H04L 65/80* (2013.01); *H04L 1/1874* (2013.01); *H04L 43/0864* (2013.01); *H04L 65/4069* (2013.01); *H04L 65/607* (2013.01)

(58) Field of Classification Search
None
See application file for complete search history.

(56) References Cited

U.S. PATENT DOCUMENTS

| | | | |
|---|---|---|---|
| 6,850,488 B1 | 2/2005 | Wesley et al. | |
| 7,032,153 B1 * | 4/2006 | Zhang | H04L 1/0018 714/749 |
| 7,633,880 B2 * | 12/2009 | Bang | H04L 47/10 370/252 |
| 8,238,287 B1 * | 8/2012 | Gopi | H04L 41/0816 370/328 |

(Continued)

FOREIGN PATENT DOCUMENTS

| | | |
|---|---|---|
| EP | 2129046 A1 | 12/2009 |
| WO | WO 2018109500 | 6/2018 |

OTHER PUBLICATIONS

Block Error correction codes and convolutional codes, Cheong, Mar. 12, 2018.

(Continued)

*Primary Examiner* — Steve R Young
(74) *Attorney, Agent, or Firm* — Byrne Poh LLP

(57) ABSTRACT

A method for a live stream connector includes receiving an input media stream of data with input parameter and transmitting, to a receiving node, the input media stream as packetized data with a header indicating the input parameters. The receiving node is configured with a receiving buffer based on the input parameters of the header and is configured to emit the packetized data to a destination when an amount of delay since receipt of the packetized data satisfies the latency input of the input parameters. The method further includes receiving, from a feedback node, a control packet identifying a missing packet within the trans- (Continued)

mission. The method also includes identifying that a retransmission buffer includes the missing packet and determining whether a sender buffer includes the identified missing packet. When the sender buffer includes the identified missing packet, the method includes retransmitting the identified missing packet to the receiving node.

30 Claims, 9 Drawing Sheets

(56) References Cited

U.S. PATENT DOCUMENTS

| | | | |
|---|---|---|---|
| 8,306,058 B2* | 11/2012 | Bai | H04L 47/2416 |
| | | | 370/468 |
| 9,485,055 B2* | 11/2016 | Tzannes | H04L 45/00 |
| 9,699,519 B2 | 7/2017 | Watson et al. | |
| 9,769,043 B2* | 9/2017 | Modai | H04L 43/0841 |
| 2002/0120942 A1 | 8/2002 | Avison | |
| 2006/0291468 A1 | 12/2006 | Bopardikar et al. | |
| 2007/0274215 A1* | 11/2007 | Gusat | H04L 1/1874 |
| | | | 370/235 |
| 2010/0020686 A1* | 1/2010 | Lee | H04L 41/5003 |
| | | | 370/231 |
| 2011/0206022 A1 | 8/2011 | Grewe et al. | |
| 2013/0007823 A1 | 1/2013 | Mangs et al. | |

OTHER PUBLICATIONS

International Search Report and Written Opinion dated Nov. 27, 2019 in International Patent Application No. PCT/US2019/054237.

* cited by examiner

LIVE STREAM CONNECTOR

TECHNICAL FIELD

This disclosure relates to a live stream connector.

BACKGROUND

As technology related to network communications has grown to transfer information over distances near and far, telecommunication systems transfer packets of data across these distances. Depending on the technology involved in the data packet transfer, data packets may be lost or distorted resulting in an imperfect data transfer. These imperfect data transfers often detrimentally impact media streaming services. This may become especially problematic in the case of live media streaming because live media streaming demands both low loss and low latency. More particularly, it is easy for a consumer of the live media stream to recognize quality problems caused by latency and loss. Consequently, these quality issues typically make a live media stream undesirable for the consumer. As people increasingly communicate using real-time and live connections, improved data transport systems may be implemented to deliver media streams with a tolerable level of data loss and latency.

SUMMARY

One aspect of the disclosure provides a method for a data transport system. The method includes receiving, at data processing hardware of a sender device, an input media stream of data, a bit rate input, and a latency input. The bit rate input and the latency input are associated with transmitting the input media stream of data. The method also includes packetizing, by the data processing hardware, the data of the input media stream, the packetized data including a header indicating the bit rate input and the latency input. The method further includes communicating, by the data processing hardware, the packetized data to a retransmission buffer of a control layer and a sender buffer of a sender layer. The control layer and the sender layer correspond to hierarchical layers of the data processing hardware. The method also includes transmitting, by the data processing hardware, the packetized data from the sender buffer of the sender layer to a receiving node. The packetized data when received by the receiving node causes the receiving node to initialize a receiving buffer based on the latency input and the bit rate input of the header and emit the packetized data to a destination when an amount of delay since receipt of the packetized data satisfies the latency input. The method further includes receiving, at the control layer of the data processing hardware, a control packet from a feedback node, the control packet identifying a missing packet within the transmission of the packetized data. Additionally, the method includes identifying, by the data processing hardware, that the retransmission buffer of the control layer includes the missing packet and determining, by the data processing hardware, whether the sender buffer of the sender layer includes the identified missing packet. When the sender buffer includes the identified missing packet, the method includes retransmitting, by the sender layer of the data processing hardware, the identified missing packet to the receiving node.

Implementations of the disclosure may include one or more of the following optional features. In some implementations, each of the retransmission buffer, the sender buffer, and the receiving buffer are dynamically structured based on the bit rate input and the latency input. At least one of the retransmission buffer, the sender buffer, or the receiving buffer may include a circular buffer. When the sender buffer fails to include the identified missing packet, the method may include writing, by the control layer of the data processing hardware, the identified missing packet to the sender buffer and retransmitting, by the sender layer of the data processing hardware, the identified missing packet from the sender buffer to the receiving node.

In some configurations, transmitting the packetized data includes distributing the packetized data to a plurality of receiving nodes. The receiving node may be configured to receive a query for the packetized data from an end client at the destination and emit the packetized data based on a query from each node to the end client. The control layer and the sender layer of the data processing hardware of the sending device may be located at a local broadcaster. The receiving node and the feedback node may be located at a remote system remote from the local broadcaster.

In some examples, the control layer is configured to perform the following operations: manage the retransmission buffer; receive the control packet; compare the identified missing packet of the control packet to packets of the retransmission buffer; write the identified missing packet to the sender buffer; and store packet information including packet acknowledgments, packet sending timestamps, and packet retransmission timestamps. In other examples, the method includes: sending, by the sender layer of the data processing hardware, a round trip time (RTT) ping packet to the receiving node; receiving, at the control layer of the data processing hardware, the sent RTT ping packet; and generating, by the control layer of the data processing hardware, a round trip time based on the received RTT ping packet. Here, retransmitting the identified missing packet to the receiving node may include delaying, by the control layer, the retransmission of the identified missing packet to the receiving node by the round trip time.

In some implementations, the control packet includes a bitmap structure indicative of a respective received packet and a respective missing packet. The bitmap structure is organized from an oldest missing packet to a newest missing packet within a delay window corresponding to the latency input. The sender layer may be configured to send the packetized data at a send rate equal to the input bit rate. Additionally or alternatively, the sender layer may be configured to send the packetized data at a send rate of about 1.5 to 2.0 times the input bit rate based on a factor of capacity for the sender buffer.

In some examples, communicating the packetized data includes generating parity packets to send the receiving node for forward error correction. In this example, transmitting the packetized data from the sender buffer of the sender layer to the receiving node includes transmitting the parity packets for forward error correction.

Another aspect of the disclosure provides a method for a data transport system. The method includes receiving, at data processing hardware of a receiving node, packetized data at a receiving buffer of the data processing hardware. The packetized data corresponds to a media stream and includes a header indicating a bit rate input and a latency input associated with the media stream. The method also includes generating, by the data processing hardware, a control packet at a feedback node of the receiver device. The control packet is based on the received packetized data and identifies a missing packet from the received packetized data. The method further includes communicating, by the data processing hardware, the control packet from the feedback node to a control layer of a sender device. The control layer includes a retransmission buffer and is configured to perform operations. The operations include identifying that the retransmission buffer includes the missing packet identified by the control packet and determining whether a sender buffer of a sender layer of the sender device includes the identified missing packet. When the sender buffer includes the identified missing packet, the operation includes instructing the sender layer to retransmit the identified missing packet. The method further includes receiving, at the data processing hardware, the retransmitted missing packet at the receiving buffer. When an amount of delay since receipt of the packetized data satisfies the latency input, the method includes emitting, by the data processing hardware, the packetized data to a destination.

This aspect may include one or more of the following optional features. In some configurations, each of the retransmission buffer, the sender buffer, and the receiving buffer are dynamically structured based on the bit rate input and the latency input. At least one of the retransmission buffer, the sender buffer, or the receiving buffer may include a circular buffer. When the sender buffer fails to include the identified missing packet, the operations of the control layer may include writing the identified missing packet to the sender buffer and instructing a retransmission of the identified missing packet from the sender buffer to the receiving node.

In some examples, receiving the packetized data includes receiving the packetized data at a plurality of receiving nodes. The method may also include receiving, at the data processing hardware of the receiving node, a query for the packetized data from an end client at the destination and emitting, by the data processing hardware of the receiving node, the packetized data based on a query from each node to the end client. The control layer and the sender layer of the sending device may be located at a local broadcaster and the receiving node and the feedback node may be located at a remote system remote from the local broadcaster and correspond to a receiving device.

In some implementations, the operations of the control layer include managing the retransmission buffer, comparing the identified missing packet of the control packet to packets of the retransmission buffer, writing the identified missing packet to the sender buffer, and storing packet information. The packet information includes packet acknowledgments, packet sending timestamps, and packet retransmission timestamps. The method may include receiving, at the data processing hardware, a round trip time (RTT) ping packet from the sender layer at the receiving node and sending, by the data processing hardware, the RTT ping packet from the receiving node to the control layer. The RTT ping packet is configured to determine the round trip time of a packet. Here, the operations of the control layer may include delaying the retransmission of the identified missing packet to the receiving node by the round trip time.

In some configurations, the control packet includes a bitmap structure indicative of a respective received packet and a respective missing packet. The bitmap structure is organized from an oldest missing packet to a newest missing packet within a delay window corresponding to the latency input. The sender layer may be configured to send the packetized data at a send rate equal to the input bit rate. Optionally, the sender layer may be configured to send the packetized data at a send rate of about 1.5 to 2.0 times the input bit rate based on a factor of capacity of the sender buffer. Receiving the packetized data may include receiving parity packets for forward error correction.

Another aspect of the disclosure provides a method for a data transport system. The method includes receiving, at data processing hardware, an input media stream of data, a bit rate input, and a latency input. The bit rate input and the latency input are associated with transmitting the input media stream of data. The method also includes transmitting, by the data processing hardware, the input media stream as packetized data to a receiving node. The packetized data includes a header indicating the bit rate input and the latency input. The receiving node is configured with a receiving buffer based on the latency input and the bit rate input of the header and the receiving node is configured to emit the packetized data to a destination when an amount of delay since receipt of the packetized data satisfies the latency input. The method further includes receiving, at the data processing hardware, a control packet from a feedback node. The control packet identifies a missing packet within the transmission of the packetized data. The method also includes identifying, by the data processing hardware, that a retransmission buffer includes the missing packet and determining, by the data processing hardware, whether a sender buffer configured to send the packetized data includes the identified missing packet. When the sender buffer includes the identified missing packet, the method includes retransmitting, by the data processing hardware, the identified missing packet to the receiving node Another aspect of the disclosure provides a distributed system for a data transport system. The system includes a sender device including a control layer and a sender layer and a receiver device in communication with the sender architecture. The receiver architecture includes a plurality of nodes and a receiving buffer. The plurality of nodes includes at least one feedback node and the receiving buffer is defined by an input bitrate and an input latency. At least one of the sender architecture and the receiver architecture includes data processing hardware and memory hardware in communication with the data processing hardware. The memory hardware stores instructions that when executed on the data processing hardware cause the data processing hardware to perform operations. The operations include receiving, at the sender device, an input media stream of data, the bit rate input, and the latency input. The bit rate input and the latency input are associated with transmitting the input media stream of data. The operations also include packetizing the data of the input media stream. The packetized data includes a header indicating the bit rate input and the latency input. The operations further include communicating the packetized data to a retransmission buffer of the control layer and a sender buffer of the sender layer. The control layer and the sender layer correspond to hierarchical layers of the data processing hardware. The operations also include transmitting the packetized data from the sender buffer of the sender layer to the receiving node. The packetized data, when received by the receiving node of the receiver device, causes the receiving node to initialize the receiving buffer based on the latency input and the bit rate input of the header and emit the packetized data to a destination when an amount of delay since receipt of the packetized data satisfies the latency input. The operations further include receiving, at the control layer, a control packet from the at least one feedback node of the receiver device, the control packet identifying a missing packet within the transmission of the packetized data. The operations also include identifying that the retransmission buffer of the control layer includes the missing packet and determining whether the sender buffer of the sender layer includes the identified missing packet. When the sender buffer includes the identified missing packet, the operations include retransmitting, by the sender layer, the identified missing packet to the receiving node.

Implementations of the disclosure may include one or more of the following optional features. In some implementations, each of the retransmission buffer, the sender buffer, and the receiving buffer are dynamically structured based on the bit rate input and the latency input. At least one of the retransmission buffer, the sender buffer, or the receiving buffer may include a circular buffer. When the sender buffer fails to include the identified missing packet, the operations may include writing, by the control layer of sender device, the identified missing packet to the sender buffer and retransmitting, by the sender layer of the sender device, the identified missing packet from the sender buffer to the receiving node. Transmitting the packetized data may include distributing the packetized data to a plurality of receiving nodes.

In some examples, the receiving node is configured to receive a query for the packetized data from an end client at the destination and emit the packetized data based on a query from each node to the end client. The control layer and the sender layer of the data processing hardware of the sending device may be located at a local broadcaster and the receiving node and the feedback node may be located at a remote system remote from the local broadcaster. Optionally, the control layer may be configured to perform the following operations: manage the retransmission buffer, receive the control packet; compare the identified missing packet of the control packet to packets of the retransmission buffer; write the identified missing packet to the sender buffer; and store packet information comprising packet acknowledgments, packet sending timestamps, and packet retransmission timestamps.

In some configurations, the operations include sending, by the sender layer, a round trip time (RTT) ping packet to the receiving node, receiving, at the control layer, the sent RTT ping packet, and generating, by the control layer, a round trip time based on the received RTT ping packet. Here, the operation of retransmitting the identified missing packet to the receiving node may also include delaying, by the control layer, the retransmission of the identified missing packet to the receiving node by the round trip time. The control packet may include a bitmap structure indicative of a respective received packet and a respective missing packet, the bitmap structure organized from an oldest missing packet to a newest missing packet within a delay window corresponding to the latency input.

In some implementations, the sender layer is configured to send the packetized data at a send rate equal to the input bit rate. Additionally or alternatively, the sender layer may be configured to send the packetized data at a send rate of about 1.5 to 2.0 times the input bit rate based on a factor of capacity for the sender buffer. The operation of communicating the packetized data may include generating parity packets to send the receiving node for forward error correction. Optionally, the operation of transmitting the packetized data from the sender buffer of the sender layer to the receiving node may also include transmitting the parity packets for forward error correction.

Another aspect of the disclosure includes a distributed system for a data transport system. The system includes a sender device including a control layer and a sender layer and a receiver device in communication with the sender architecture. The receiver architecture includes a plurality of nodes and a receiving buffer. The plurality of nodes includes at least one feedback node and at least one receiving node. The receiving buffer is defined by an input bitrate and an input latency. At least one of the sender architecture and the receiver architecture includes data processing hardware and memory hardware in communication with the data processing hardware. The memory hardware stores instructions that when executed on the data processing hardware cause the data processing hardware to perform operations. The operations include receiving, at the at least one receiving node of the receiver device, packetized data at the receiving buffer of the data processing hardware. The packetized data corresponds to a media stream and includes a header indicating the bit rate input and the latency input associated with the media stream. The operations further include generating, at the at least one feedback node of the receiver device, a control packet based on the received packetized data and identifying a missing packet from the received packetized data. The operations also include communicating the control packet from the feedback node to the control layer of the sender device. The control layer includes a retransmission buffer and is configured to perform the following operations: identify that the retransmission buffer includes the missing packet identified by the control packet; determine whether a sender buffer of the sender layer of the sender device includes the identified missing packet; and when the sender buffer includes the identified missing packet, instructing the sender layer to retransmit the identified missing packet. The operations further include receiving, at the at least one receiving node, the retransmitted missing packet at the receiving buffer. When an amount of delay since receipt of the packetized data satisfies the latency input, the operations include emitting, from the at least one receiving node, the packetized data to a destination.

Implementations of the disclosure may include one or more of the following optional features. In some examples, each of the retransmission buffer, the sender buffer, and the receiving buffer are dynamically structured based on the bit rate input and the latency input. Additionally or alternatively, at least one of the retransmission buffer, the sender buffer, or the receiving buffer may include a circular buffer. When the sender buffer fails to include the identified missing packet, the operations of the control layer may include writing the identified missing packet to the sender buffer and instructing a retransmission of the identified missing packet from the sender buffer to the receiving node. The operation of receiving the packetized data may include receiving the packetized data at a plurality of receiving nodes.

In some configurations, the operations include receiving, at the at least one receiving node, a query for the packetized data from an end client at the destination and emitting, from the at least one receiving node, the packetized data based on a query from each node to the end client. The control layer and the sender layer of the sending device may be located at a local broadcaster. Optionally, the receiving node and the feedback node may be located at a remote system remote from the local broadcaster. The operations of the control layer may include managing the retransmission buffer, comparing the identified missing packet of the control packet to packets of the retransmission buffer, writing the identified missing packet to the sender buffer, and storing packet information including packet acknowledgments, packet sending timestamps, and packet retransmission timestamps.

In some implementations, the operations include receiving, from the sender layer at the receiving node, a round trip time (RTT) ping packet configured to determine the round trip time of a packet and sending, from the receiving node to the control layer, the RTT ping packet. Here, the operations of the control layer may also include delaying the retransmission of the identified missing packet to the receiving node by the round trip time.

In some examples, the control packet includes a bitmap structure indicative of a respective received packet and a respective missing packet. The bitmap structure may be organized from an oldest missing packet to a newest missing packet within a delay window corresponding to the latency input. The sender layer may be configured to send the packetized data at a send rate equal to the input bit rate or to send the packetized data at a send rate of about 1.5 to 2.0 times the input bit rate based on a factor of capacity of the sender buffer. The operation of receiving the packetized data may also include receiving parity packets for forward error correction.

Another aspect of the disclosure provides a system for a data transport system. The system includes data processing hardware and memory hardware in communication with the data processing hardware. The memory hardware stores instructions that when executed on the data processing hardware cause the data processing hardware to perform operations. The operations include receiving an input media stream of data, a bit rate input, and a latency input, the bit rate input and the latency input associated with transmitting the input media stream of data. The operations also include transmitting the input media stream as packetized data to a receiving node. The packetized data includes a header indicating the bit rate input and the latency input. The receiving node is configured with a receiving buffer based on the latency input and the bit rate input of the header. The receiving node is also configured to emit the packetized data to a destination when an amount of delay since receipt of the packetized data satisfies the latency input. The operations further include receiving a control packet from a feedback node, the control packet identifying a missing packet within the transmission of the packetized data. Additionally, the operations include identifying that a retransmission buffer includes the missing packet and determining whether a sender buffer configured to send the packetized data includes the identified missing packet. When the sender buffer includes the identified missing packet, the operations include retransmitting the identified missing packet to the receiving node.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Data is often transported between two endpoints (e.g., a source/host and a destination) by a computer network. Computer networks generally have a layered architecture such that a transport layer of the layered architecture is responsible for data delivery. Unfortunately, as data demands of everyday applications increase, existing transport layer protocols often fail to satisfy these data demands. One such type of data that is becoming increasingly popular is media streaming services (e.g., live media streams). As the availability of media streaming services increases, issues with media streaming become more apparent. For example, consumers (i.e. end users) can easily notice changes in quality for live media streams. This is especially true as modern display devices (e.g., televisions, monitors, device screens, etc.) offer increased resolution (e.g., 1080p, 2K, 4K, UHD, etc.). Furthermore, the increased resolution typically diminishes a consumers tolerance of data loss and/or latency related to the media stream (e.g., live media stream) being consumed. These issues are further compounded when existing protocols (e.g., user datagram protocol (UDP) and transmission control protocol (TCP)) fail to address the challenges associated with high quality and low latency.

The transport layer generally ensures end-to-end communication of messages or data across a network (e.g., the network 120). The transport layer may send transmissions via a connection mode or a connectionless mode. Transmission control protocol (TCP) is a common connection-oriented transmission protocol. A connection-oriented transmission transmits packets that require reconstruction at a destination and utilizes acknowledgements as an assurance for transmission. In contrast, a connectionless-oriented transmission does not require a virtual circuit to be established before packet transmission nor require acknowledgement of the receipt of data. Although TCP is a common protocol for internet connectivity due to its ability to packetize large data sets, check for and resend lost packets, and properly reconstruct the packets, the functions performed by TCP may cost additional data resources and contribute to transmission delays. User datagram protocol (UDP), on the other hand, is lightweight (i.e. operates with relatively low bandwidth), robust, and connectionless protocol because UDP sends packets without additional services (e.g., reconstruction or acknowledgements). Yet a downside to UDP is that packets may take different paths between a source and a destination resulting in issues such as packet loss or packets being out of order.

Figure 1:
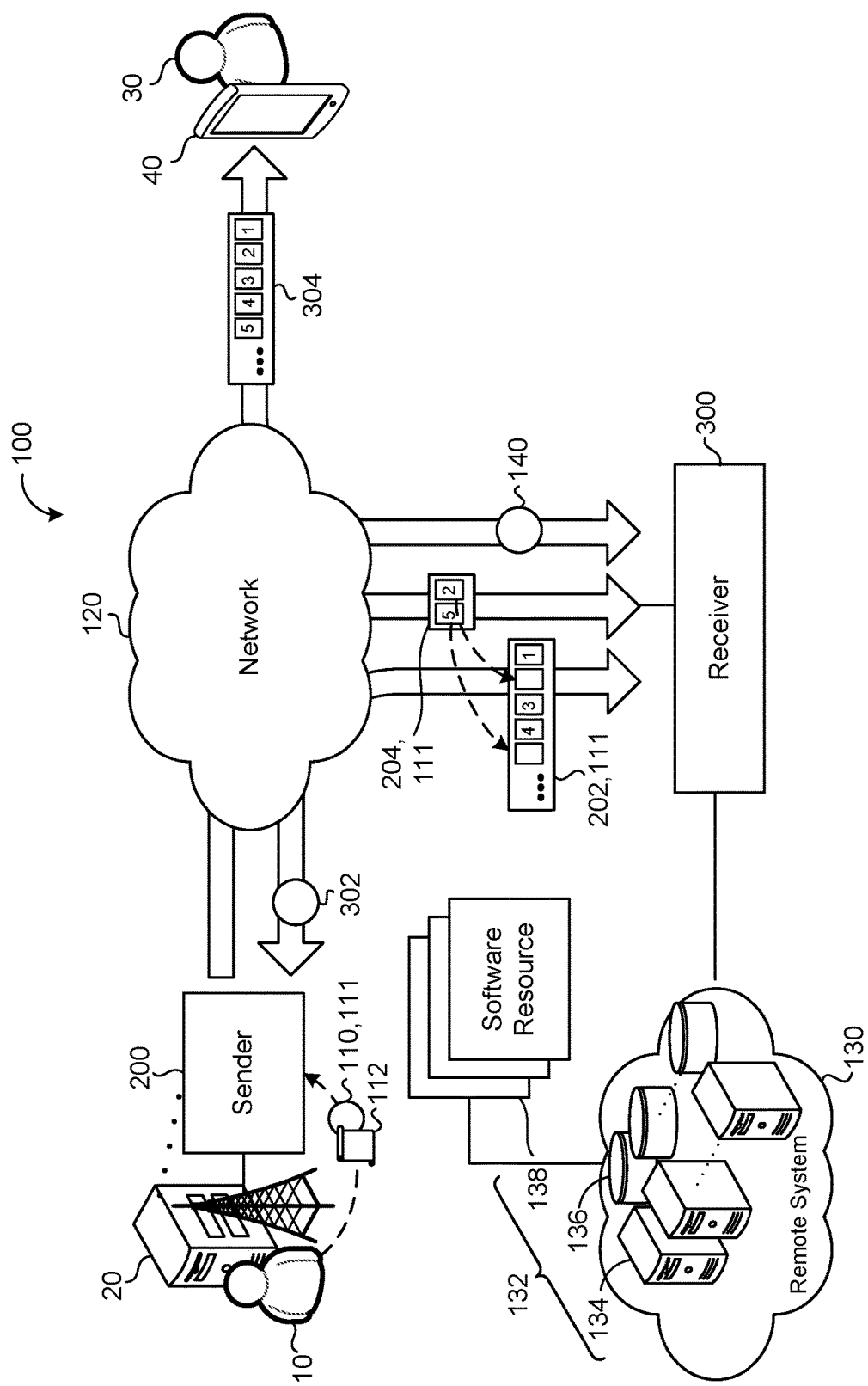
FIG. 1 is a schematic view of an example data transport system.

FIG. 1 is an example of a data transport system 100 capable of improving data transport for media streaming services (e.g., live media streams) with use of a distributed UDP based transport system. The data transport system 100 includes a broadcaster 10 using server(s) 20 to communicate a media stream (e.g., an input media stream 110) of data across a network 120 to a remote system 130, such as a distributed system of a cloud environment. An end-user 30 (i.e. a consumer) with a display device 40 (e.g., computer or mobile device) may access the media stream 110 or receive the media stream 110 from streaming services related to the remote system 130. For example, the end-user 30 sends a query 140 to the remote system 130 (shown via the receiver 300) requesting the media stream 110. In other examples, the end-user 30 uses applications hosted by the remote system 130 to access the media stream 110. In some examples, after receipt of the media stream 110, the remote system 130 further processes and/or associates the media stream 110 with resources 132 of the remote system 10.

The broadcaster 10 can be any content provider or content creator capable of generating and/or distributing a media stream 110 across a network 120. For example, the broadcaster 10 is a local broadcaster remote from the remote system 130 that provides convent via media streams for distribution to end-users 30. Remote system(s) 130, such as a cloud environment, may ingest local broadcast channel live streams to acquire media content for end-users 30 and/or distribute media content for clients (e.g., the local broadcaster 10). This relationship between the broadcaster 10 and the remote system 130 enables broadcasters 10 to supply a larger market of end-users 30 than the broadcaster 10 may be able to reach by conventional broadcasting (e.g., over the air broadcasting). Additionally, the relationship may enable the remote system 130 via resources 132 (e.g., data processing hardware 134, memory hardware 136, or software resources 138) to acquire and to offer a greater amount of content. For example, the end-user 30 accesses software resources 138 in the form of media streaming applications hosted by or communicating with the remote system 130 to consume media content. Here, the broadcaster 10 uses server(s) 20 with data processing hardware and memory hardware configured to communicate with the remote system 130 across the network 120.

To communicate between the broadcaster 10 and the remote system 130, the data transport system 100 includes a two-part system with a sender 200 (also referred to as a "sender device") and a receiver 300 (also referred to a "receiving device"). The two-part system of the sender 200 and the receiver 300 may be jointly referred to as a live stream connector. Here, the sender 200 is located at the client (e.g., the broadcaster 10) of the remote system 130. For instance, the sender 200 is installed on the server(s) 20 of the broadcaster 10. The sender 200 receives an input media stream 110 of data provided (e.g., generated) by the broadcaster 10 and transmits the input media stream 110 as a transmission 202 of data to the receiver 300. As shown in FIG. 1, the sender 200 is configured to communicate via the network 120 with the receiver 300 located at the remote system 130.

To transmit the input media stream 110, the sender 200 converts the input media stream 110 into packets $P_{1-i}$ of data (i.e. packetizes). The number of packets, i, depends on the size and quality of the media stream 110. For examples, when the media stream 110 is a continuous live stream, the number of packets, i, converted by the sender 200 will be infinite unless the continuous live stream ends. The receiver 300 receives the packetized data as a transmission 202. The receiver 300 is configured to review the received transmission 202 and request 302 a retransmission 204 of portions or all of the packetized data. The receiver 300 requests the retransmission 204 for packets $P_{1-i}$ of data that the sender 200 sent to the receiver 300, but were lost or compromised during the transmission 202 (i.e. missing packets $P_M$).

Figure 2:
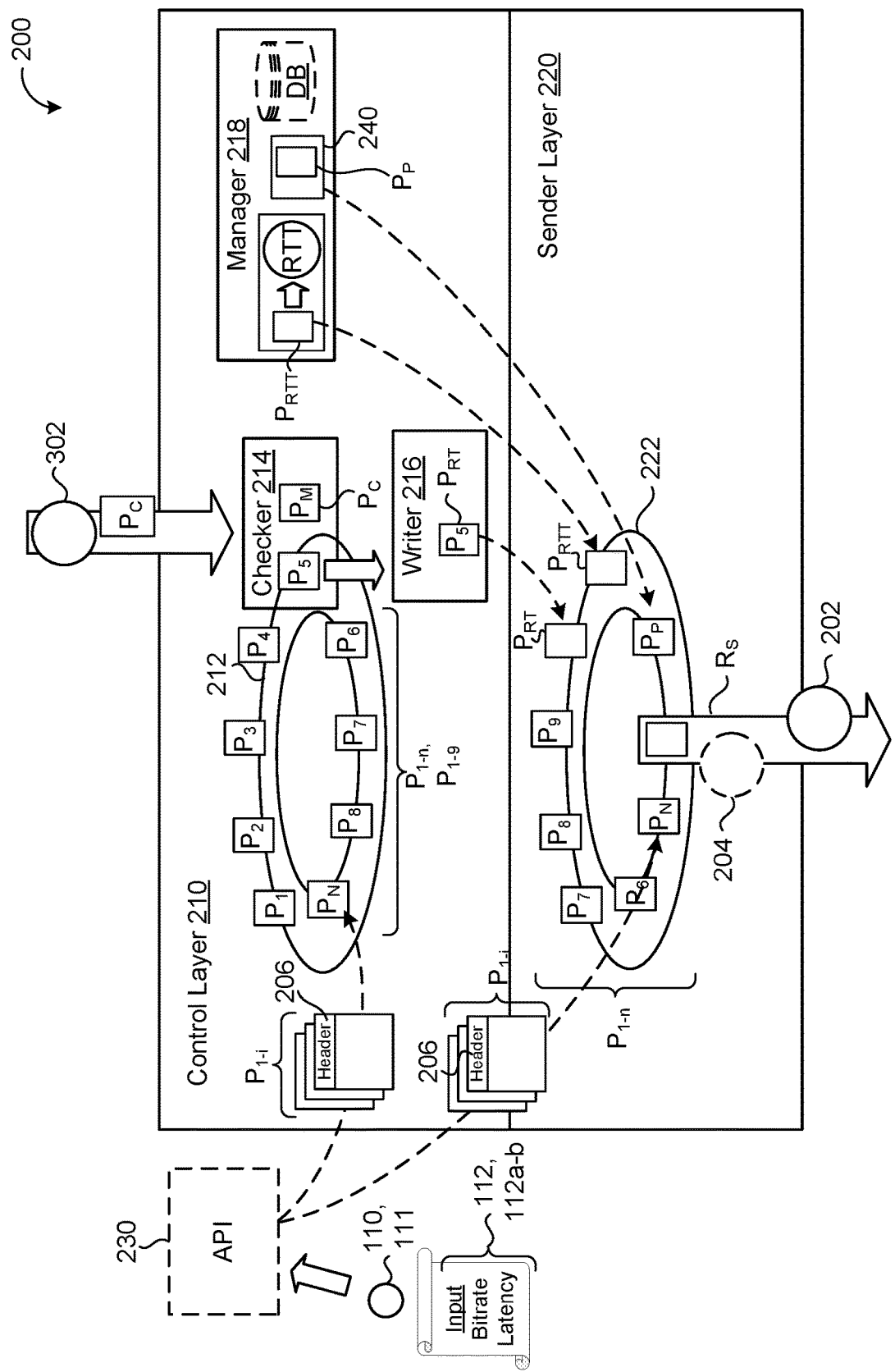
FIG. 2 is a schematic view of an example sender device of the data transport system of FIG. 1.

When the broadcaster 10 communicates the input media stream 110 to the sender 200, the broadcaster 10 additionally communicates input parameters 112 that are associated with the transmission 202 and/or retransmission 204 of the input media stream 110. The input parameters 112 may be input by a user of the live stream connector (e.g., the broadcaster 10) and configured for the application of the user. In other words, a user, such as the broadcaster 10, may be constrained by local resources (e.g., the network 120 or server processing) or by the media stream being transported. Due to these constraints, different broadcasters 10 or different media streams may be configured with different input parameters 112. The input parameters 112 include at least a bit rate input 112, 112*a* (FIG. 2) and a latency input 112, 112*b* (FIG. 2). The bit rate input 112*a* refers to the rate of data transfer of the input media stream 110 to the sender 200. The latency input 112*b* is an input parameter 112 referring to a delay window duration (e.g., generally in seconds) that defines an application's fault tolerance. The latency input 112*b* allows packet loss to be corrected within a configurable delay window duration. For example, when the latency input 112*b* is configured as two seconds, the sender 200 may retransmit missing packets $P_{M(1-i)}$ within that two seconds to correct the loss of the missing packet $P_M$. By selecting the latency input 112*b*, the live stream connector can prioritize latency with respect to reliability.

With continued reference to FIG. 1, the sender 200 sends the receiver 300 a transmission 202 that, at the sender 200, originally includes five packets $P_{1-5}$ (of data 111). Due to network reliability or other issues, the receiver 300 only receives three packets $P_1$, $P_3$, $P_4$ of the five packets $P_{1-5}$. Within the delay window duration configured by the latency input 112*b*, the receiver 300 identifies the missing packets $P_M$, $P_2$, $P_5$ and communicates a request 302 to the sender 200 for retransmission 204 of the second packet $P_2$ and the fifth packet $P_5$. The sender 200 receives the request 302 from the receiver 300 and communicates a retransmission 204 of the missing packets $P_M$, $P_2$, $P_5$. Here, once the delay window duration expires, the receiver 300 may communicate the received packets $P_{1-5}$ to a destination (e.g., a requesting party, such as the end-user 30, or the remote system 130 for storage or centralized distribution). When the delay window duration expires after receipt of the retransmission 204, the receiver 300 is able to communicate all five packets $P_{1-5}$ to the destination 30, 130. On the other hand, when the delay window duration expires before receipt of the retransmission 204, the receiver 300 communicates the available packets $P_1$, $P_3$, $P_4$ to the destination 30, 130.

FIG. 2 is an example of the sender 200 of the data transport system 100. The sender device 200 is configured to receive the input media stream 110, packetize the data 111 of the input media stream 110 into packets $P_{1-i}$, and communicate the packetized data (i.e. packets $P_{1-i}$) as a transmission 202 and/or retransmission 204 to the receiver 300. When the sender 200 packetizes the data 111 of the input media stream 110, the sender 200 generates a header 206 for the packets $P_{1-i}$ that includes information regarding the input parameters 112, such as the bit rate input 112*a* and the latency input 112*b*. By including the input parameters 112 via the header 206, each recipient of the packets $P_{1-i}$ (e.g., the control layer 210, the sender layer 220, or the receiver 300) may identify the bit rate by the bit rate input 112*a* and the delay window duration by the latency input 112*b* to further process the packets $P_{1-i}$.

Here, the sender 200 has a hierarchical structure or architecture that includes a control layer 210 and a sender layer 220. The relationship between the control layer 210 and the sender layer 220 is hierarchical such that the control layer 210 is a smart layer that manages the sender layer 220. For example, since the control layer 210 is a smart layer, the sender layer 220 does not track packet information. Rather, the sender layer 220 sends packets $P_{1-i}$ regardless of order or type at a send rate $R_S$ based on the bit rate input 112*a* and/or conditions of the sender layer 220.

In some configurations, the sender 200 receives the input media stream 110 through an application programming interface (API) 230. The API 230 may receive the input media stream 110 of data and packetize the data by adding the header 206 to the data. With the packetized data, the API 230 may communicate the packetized data to the control layer 210 and the sender layer 220. In some examples, the API 230 also communicates the packetized data to a parity generator 240 to generate parity packets $P_P$ related to the packetized data.

In some implementations, the control layer 210 includes a retransmission buffer 212 (e.g., a circular buffer). The retransmission buffer 212 is initialized dynamically based on the input parameters 112 of the input bit rate 112a and the latency input 112b. For example, the size and/or capacity of the retransmission buffer 212 is configured based on these input parameters 112. Stated differently, the retransmission buffer 212 may have a capacity of n packets $P_{1-n}$ to correspond to the desired delay window duration configured by the latency input 112b at the input bit rate 112a. The control layer 210 is configured to determine these input parameters 112 from the header 206 and configures the retransmission buffer 212 based on these input parameters 112. For simplicity of illustration, the retransmission buffer 212 is shown with nine packets $P_{1-9}$ (i.e. n=9). When the retransmission buffer 212 is full, the oldest packets are overwritten by new packets $P_N$. Since the oldest packets will be overwritten, a request 302 by the receiver 300 for retransmission 204 may time-out when the receiver 300 requests packets P that have been overwritten by new packets $P_N$ (e.g., FIG. 2 depicts what would have been the ninth packet $P_9$ being overwritten by a new packet $P_N$). When this occurs, the live stream connector will fail to correct the missing packets $P_M$ and the receiver 300 will communicate the received packets $P_{1-i}$ to the destination even though some packets $P_{1-i}$ may be missing. By storing packets $P_{1-n}$ that have been transmitted in a window specified by the delay window duration, the live stream connector trades off between reliability and latency (i.e. a user, such as a broadcaster 10, can setup the live stream connector with the latency that it believes the media stream can bear).

In addition to managing the retransmission buffer 212, the control layer 210 receives control packets $P_C$ and writes packets $P_{1-i}$ to be retransmitted to the sender layer 220 (i.e. retransmission packets $P_{RT}$ to replace the missing packets $P_M$). As shown by FIG. 2, to receive the control packets $P_C$, the control layer 210 includes a checker 214. A control packet $P_C$ is a packet that includes information (e.g., an acknowledgement) or feedback regarding the packets $P_{1-i}$ received at the receiver 300. To provide feedback regarding the packets $P_{1-i}$ received at the receiver 300, the control packets $P_C$ have a start sequence number to identify the packets $P_{1-i}$. The control packet $P_C$ may be part of or all of the request 302 by the receiver for retransmission 204. In some examples, the control packet $P_C$ includes information describing the missing packets $P_M$. In other examples, the control packet $P_C$ includes information describing both received packets $P_{1-i}$ and missing packets $P_M$. For instance, the control packet $P_C$ is a bitmap that indicates received packets $P_{1-i}$ (e.g., as 1s) and missing packets $P_M$ (e.g., as 0s). In some examples, the bitmap is organized from oldest packet duration to most recent packet in the delay window. Additionally or alternatively, received and missing packets P, $P_M$ may be identified via ACK/NACK acknowledgments.

When the control layer 210 receives a control packet $P_C$ via the checker 214, the checker 214 checks for the missing packet $P_M$ in the retransmission buffer 212. For example, the checker 214 traverses a bitmap of the control packet $P_C$ to match a sequence number of missing packet(s) $P_M$ to the retransmission buffer 212. Here, FIG. 2 in combination with FIG. 1 depicts the checker 214 receiving the control packet $P_C$ and identifying a missing packet $P_M$ of the control packet $P_C$ as corresponding to the fifth packet $P_5$. Additionally or alternatively, the checker 214 may be configured to perform retransmission checks on the matching packet (shown as the fifth packet $P_5$ within the retransmission buffer 212).

When the missing packet $P_M$ identified by the control packet $P_C$ is found and, in some cases, passes the retransmission checks, the checker 214 communicates the packet to the writer 216. The writer 216 is configured to write an identified missing packet $P_M$ within the retransmission buffer 212 to the sender layer 220 as a retransmission packet $P_{RT}$. In some implementations, the writer 216, prior to writing the retransmission packet $P_{RT}$, checks a queue of the sender layer 220 for the identified missing packet $P_M$. Here, this queue check, avoids the writer 216 from redundantly writing another copy of the identified missing packet $P_M$ to be sent to the receiver 300 when the identified missing packet $P_M$ is already scheduled at the sender layer 220 to be sent to the receiver 300.

In some configurations, the control layer 210 includes a manager 218. The manager 218 may store additional information about packets $P_{1-i}$ received at the control layer 210. Some examples of the additional information stored by the manager 218 include whether a packet P has been acknowledged before (e.g., by a control packet $P_C$), an original time stamp for when a packet P was originally sent, and information about whether a packet P has been previously transmitted/retransmitted (e.g., last transmission time). To illustrate that the control layer 210 may store this additional information, FIG. 2 depicts the manager 218 with data storage such as a database DB. Although shown as a single database DB, the additionally information may be partitioned into any number of databases.

The manager 218 is further configured to manage a round trip time (RTT) for the packets $P_{1-i}$. The RTT refers to the time it takes for a packet P to travel to the receiver 300 and back to the sender 200. The manager 218 may generate and may process RTT packets $P_{RTT}$ to identify the RTT value of the live stream connector. For instance, the sender 200 (e.g., via the manager 218) stamps an RTT packet $P_{RTT}$ with a time stamp corresponding to the time at which the RTT packet $P_{RTT}$ was sent from the sender 200 to the receiver 300. When the receiver 300 receives the RTT packet $P_{RTT}$, the receiver 300 sends the RTT packet $P_{RTT}$ back to the sender 200. The manager 218 receives the RTT packet $P_{RTT}$ and, based on the receipt time, updates the RTT value. As shown in FIG. 2, the manager 218 may periodically coordinate with the sender layer 220 to send the RTT packets $P_{RTT}$. Since the manager 218 periodically determines and/or updates the RTT value, the manager 218 may report the RTT value as a median value of the determined RTT values. Even though FIG. 2 illustrates a distinct packet as the RTT packet $P_{RTT}$, any packet P sent by the sender 200 may be configured as an RTT packet $P_{RTT}$.

Figure 3A:
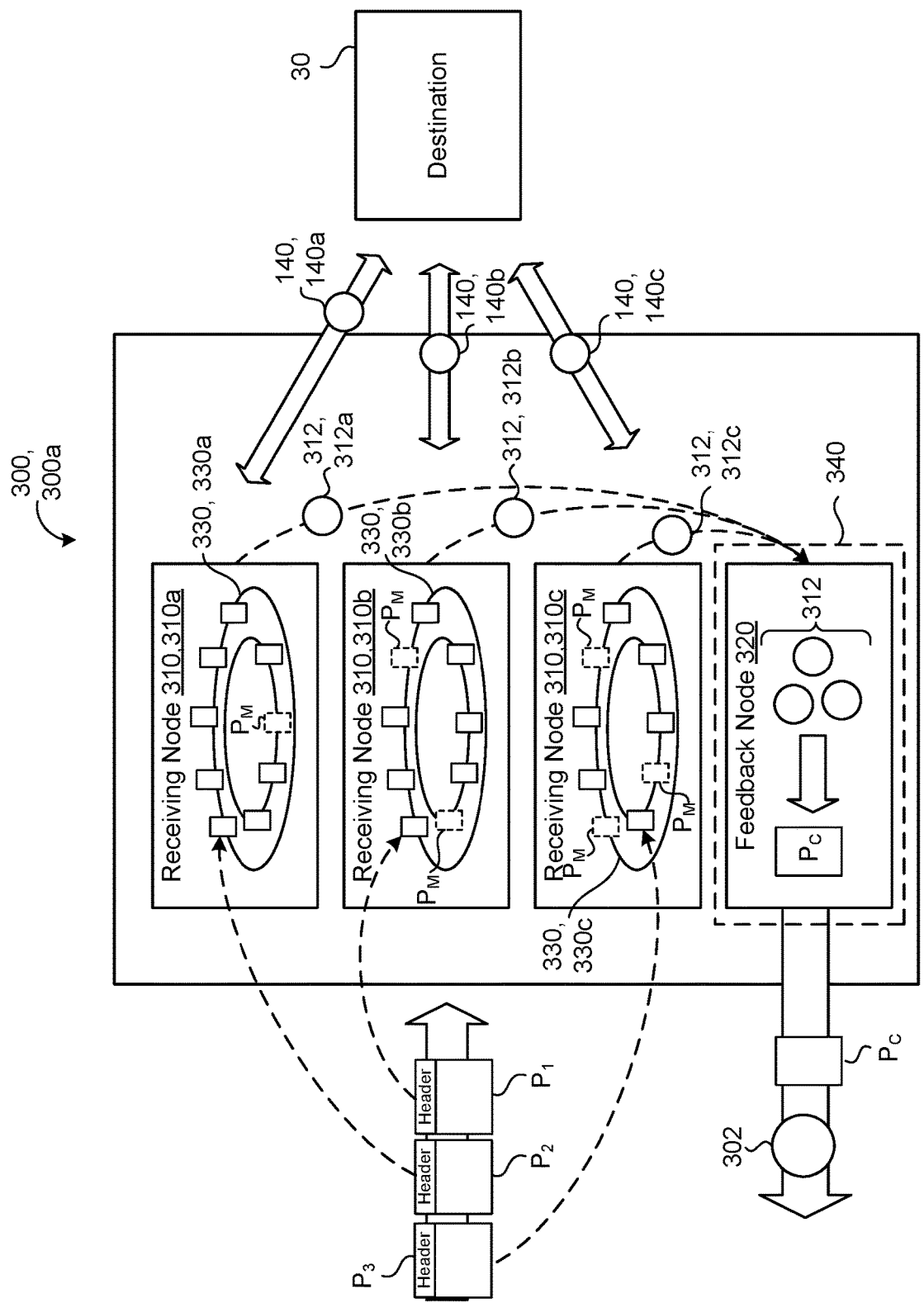
FIGS. 3A-3C are schematic views of example receiving devices of the data transport system of FIG. 1.
Figure 3B:
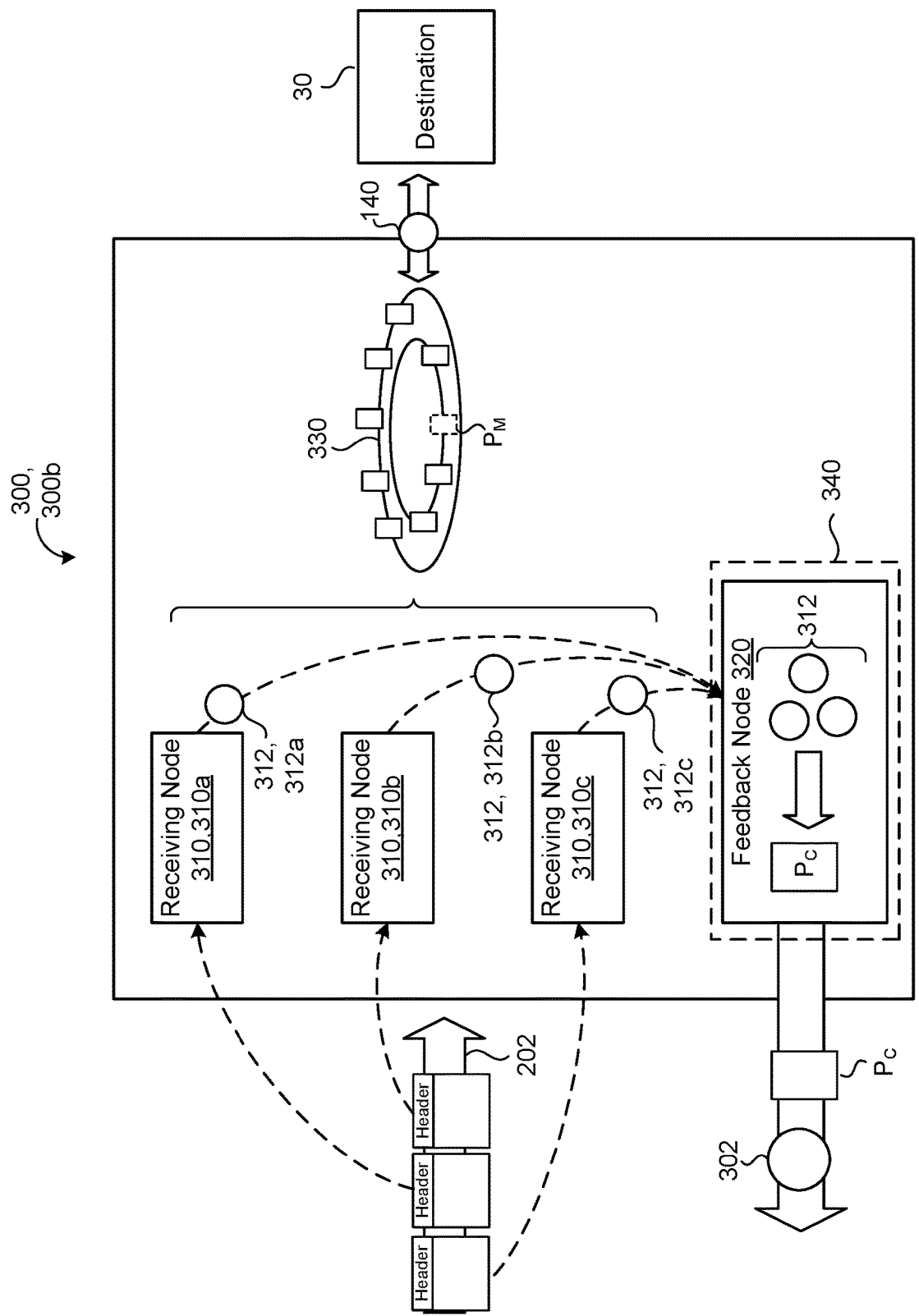

In some configurations, the receiver 300 has multiple receiving nodes 310 (FIGS. 3A and 3B). In these configurations, the manager 218 determines an RTT value for each receiving node 310 separately because each node 310 may behave differently based on a network link associated with each individual node 310. By determining the RTT value for each node 310, the sender 200 may decide, based on RTT values, that a bad network connection exists for a link between a receiving node 310 of the receiver 300 and the sender 200 and at least temporarily shut down the link. Similar to the process for shutting down a link, the manager 218 based on an updated RTT value, may activate (or resume) transmission via the link of a receiving node that was shut down.

In some examples, the control layer 210 utilizes the RTT value for retransmission 204. For instance, the control layer 210 retransmits a retransmission packet $P_{RT}$ after a delay amount of time. The delay amount of time may be set as n times the RTT value from the originally sending time (i.e. transmission 204) of the packet P corresponding to the retransmission packet $P_{RT}$. In other words, the retransmission packet in FIG. 2 corresponds to the fifth packet $P_5$. Therefore, the control layer 210 may wait two times (i.e. n=2) the RTT value from when the fifth packet $P_5$ was originally transmitted to the receiver 300 before sending the retransmission packet $P_{RT}$ corresponding to the fifth packet $P_5$. By delaying the retransmission packet $P_{RT}$, the sender 200 may account for network delay and/or prevent increasing usage of bandwidth.

In some implementations, the manager 218 includes a parity generator 240. The parity generator 240 uses the packetized data $P_{1-i}$ to generate parity packets $P_P$. Here, the parity packets $P_P$ are used for error correction (e.g., forward error correction (FEC)) within the live stream connector. A parity packet $P_P$ includes parity bits to indicate whether a packet P has experienced any issues, such as loss. The manager 218 of the control layer 210 may write the parity packet $P_P$ to the sender layer 220 for transmission to the receiver 300.

With continued reference to FIG. 2, the sender 200 includes the sender layer 220 with a sender buffer 222. The sender layer 220 may receive different packets $P_N$, $P_{RT}$, $P_P$, $P_{RTT}$ at the sender buffer 222 from different sources to send to the receiver 300. These packets $P_{1-i}$ include a new packet $P_N$ (e.g., from the API 230), a retransmission packet $P_{RT}$ (e.g., from the writer 216), a parity packet $P_P$ (e.g., from the parity generator 240), and a RTT packet $P_{RTT}$ (e.g., from the manager 218). Like the retransmission buffer 212 of the control layer 210, the sender buffer 222 may be dynamically configured based on the input parameters 112 (e.g., include n packets $P_{1-n}$ where n corresponds to the capacity of the sender buffer 222). In some examples, the sender buffer 222 is a circular buffer. The sender buffer 222 may be a first-in-first-out (FIFO) buffer where the sender buffer 222 writes the packets $P_{1-n}$ to sequential slots without ordering the packets $P_{1-n}$ according to the sequence number of each respective packet P. A FIFO buffer refers to a buffer where the oldest packet is sent by the sender layer 220 first and the newest packet is placed in queue to be sent last.

The sender layer 220 sends the packets $P_{1-n}$ within the sender buffer 222 at the sender rate $R_S$. The sender rate $R_S$ is generally configured such that sender layer 220 may send packets $P_{1-n}$ to match the input bit rate 112a of the input media stream 110. In some implementations, the sender layer 220 is configured to dynamically adjust the sender rate $R_S$. The sender layer 220 may adjust the sender rate $R_S$ by two factors: (1) the input bit rate 112a; and (2) the fullness of the send queue of the sender buffer 222. When the input bit rate 112a changes or the actual input rate of the input media stream 110 is greater than the configured input bit rate 112a, the sender buffer 222 will begin to fill up. To alleviate an imbalance between the sender rate $R_S$ and the filling rate of the input media stream 110, the sender layer 220 may increase the sender rate $R_S$. For instance, the sender layer 220 increases the sender rate $R_S$ a factor of 1.5-2.0 based on a factor of the sender buffer fullness. In other words, the sender rate $R_S$ may be dynamically changed to prevent the sender buffer 222 from being full and unable to accommodate for packets $P_{1-i}$ that need to be sent to the receiver 300. In some examples, the input parameters 112 include a maximum bit rate, such that even though the sender layer 220 dynamically adjusts the sender rate $R_S$, the sender layer 220 is configured not to exceed the maximum bit rate.

Figure 3C:
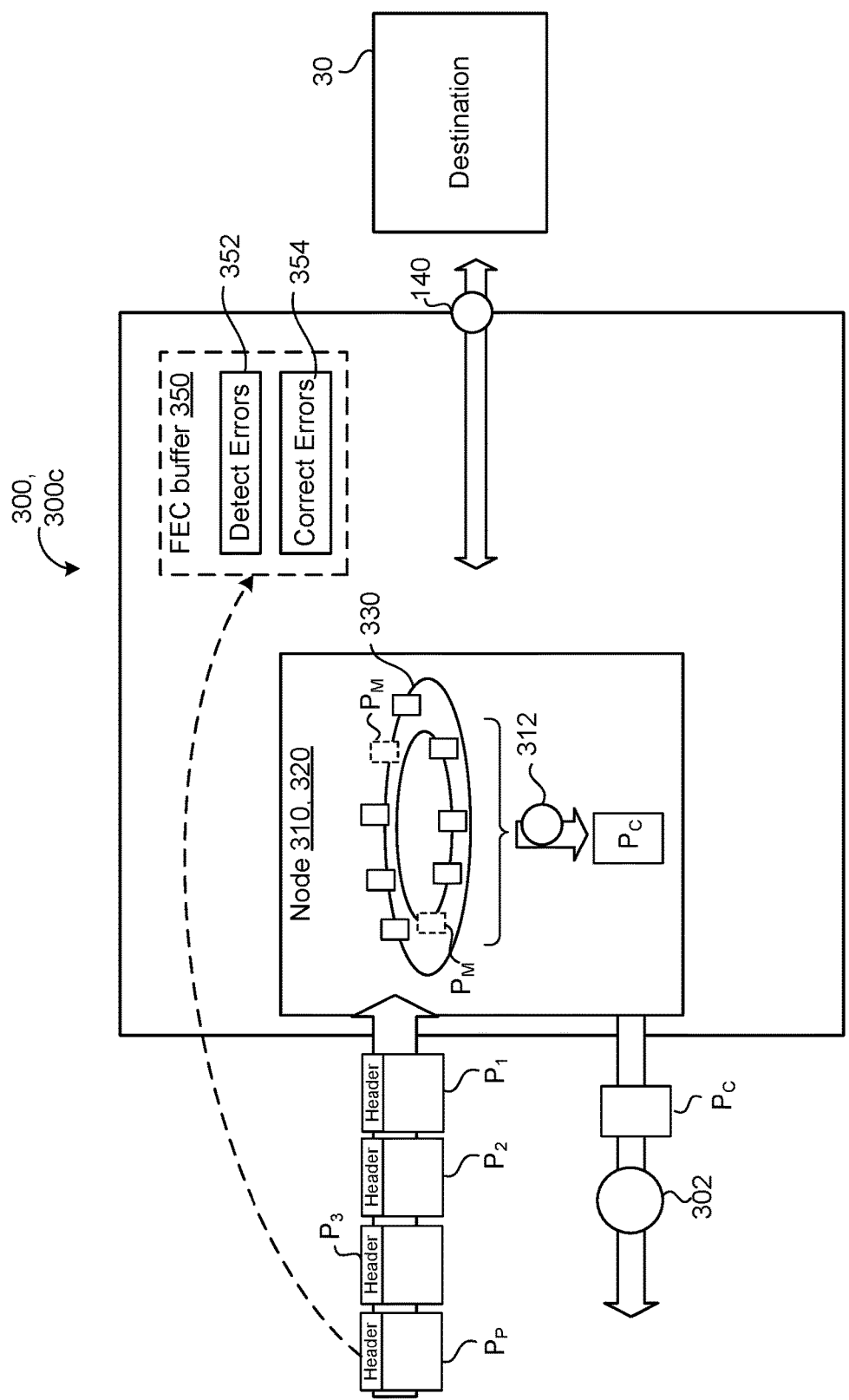

FIGS. 3A-3C are examples of the receiver 300 of the data transport system 100. The receiver 300 is configured to receive packets $P_{1-i}$ sent by the sender 200 at a receiving node 310 and to generate requests 302 (e.g., a control packet $P_C$) for the sender 200. Additionally or alternatively, the receiver 300 implements forward error correction (FEC) for residual errors. In some examples, such as FIGS. 3A and 3B, the receiver 300 is a multi-nodal receiver 300a-b with a plurality of receiving nodes 310, 310a-n and a feedback node 320. In other examples, such as FIG. 3C, the receiver 300 is a single node receiver 300c with a single receiving node 310 that also functions as the feedback node 320. In yet other examples, the number n of receiving nodes 310, 310a-n depends on the application of the live stream connector and/or network conditions between the sender 200 and the receiver 300. By having the number n of receiving nodes 310 dynamically configurable to network conditions, the live stream connector may maximize its use of the network 120. For example, network links between the sender 200 and a corresponding receiving node 310 may be shut down (e.g., temporarily) based on the network connection of the network 120. For the multi-nodal receiver 300a-b, the packetized data of the media stream 110 may be dynamically distributed over the remaining active receiving nodes 310 (i.e. the non-shutdown receiving nodes 310). Even though the examples of FIGS. 3A-3C depict the receiver 300 with either multiple receiving nodes 310 or a single receiving node 310, the receiver 300a is scalable by any number of nodes such that the receiver 300 may dynamically change from the multi-nodal receiver 300a-b of FIGS. 3A and 3B to a single node receiver 300c of FIG. 3C, or vice versa. For instance, in simpler applications with lower constraints and reliable network links, the receiver 300 may use a single receiving node 310 to reduce redundancy.

For a multi-nodal receiver 300a-b, such as FIGS. 3A and 3B, each receiving node 310 receives part of the media stream 110 as a transmission 202 of packetized data (e.g., shown as $P_{1-3}$). Here, the first receiving node 310a receives the second packet $P_2$. The second receiving node 310b receives the first packet $P_1$ and the third receiving node 310c receives the third packet $P_3$. In contrast, FIG. 3C depicts a single node as the receiving node 310 that receives all three of the packets $P_{1-3}$. In either design, the receiver 300 includes a receiving buffer 330. Much like the retransmission buffer 212 and the sender buffer 222, the receiving buffer 330 may be dynamically configured based on the input parameters 112 included in the header(s) 206 of the packet(s) $P_{1-i}$. In some examples, the receiver buffer 330 is a circular buffer. Here, whenever a receiving node 310 receives a packet P, the received packet P is written to a corresponding location in the receiving buffer 330 based on a sequence number of the packet P within the header 206. Based on this approach, when there is a missing packet $P_M$ (e.g., shown in FIGS. 3A-3C by a dotted outline in the receiving buffer 330), the receiving buffer slot corresponding to the missing packet $P_M$ is skipped by the receiver 300. In some examples, an indicator (e.g., a flag) is set at the receiving buffer slot of the missing packet $P_M$ to mark the packet P as missing. When the receiving buffer 330 is full, the receiver 300 emits an oldest packet from the receiving buffer 330 to allow the receiving buffer 330 to continue receiving new packets $P_N$.

With multi-nodal receiver configurations, such as FIGS. 3A and 3B, the receiving buffer 330 may be distributed (FIG. 3A) or centralized (FIG. 3B) depending on the application. In a distributed receiving buffer 330, 330a-c, the packetized data $P_{1-i}$ may be emitted by at least two methods. In some examples, the end-user 30 communicates a query 140, 140a-c to each receiving node 310a-c and receives the packets $P_{1-i}$ directly from the receiving nodes 310a-c. In other examples, the receiving nodes 310a-c acquire an address for the destination of the end-user 30 and emit the packets $P_{1-i}$ from each of the receiving buffers 330a-c to the address of the destination (e.g., shown as the end-user 30). To illustrate these methods, FIG. 3A depicts a double headed arrow from the receiving nodes 310a-c to the destination. In a similar manner, when the receiving buffer 330 is centralized, as shown by FIG. 3B or FIG. 3C, the destination (i.e. end-user 30) may send a query 140 for emission of the packets $P_{1-i}$ or the receiver 300 may emit the packets $P_{1-i}$ to the destination. In any configuration of the receiver 300, the receiver 300 may emit packets $P_{1-i}$ (e.g., for a query 140) when the amount of delay satisfies the latency input 112b to allow the live stream connector the time to correct missing packets $P_M$.

In order to generate acknowledgments and/or requests 302 for the sender 200, the receiver 300 includes a feedback node 320. The feedback node 320 may be a dedicated node for feedback 312 (e.g., FIGS. 3A and 3B) or be a receiving node 310 also functioning as the feedback node 320 (e.g., FIG. 3C). The feedback node 320 is configured to generate the control packets $P_C$ and send the control packets $P_C$ to the sender 200. Depending on the delay window duration, the feedback node 320 may generate a single control packet $P_C$ or more than one control packet $P_C$. In some examples, such as FIG. 3A, the feedback node 320 generates the control packet(s) $P_C$ based on feedback 312 gathered and/or received from at least one receiving node 310 (shown in FIGS. 3A and 3B as three receiving nodes 310a-c). The feedback 312 is information about the receipt of packets $P_{1-i}$ at the at least one receiving node 310.

In some examples, the receiving node(s) 310 writes and/or communicates feedback 312, 312a-c regarding received packets $P_{1-i}$ such that the feedback node 320 can deduce missing packets $P_M$ from the transmission 202 (e.g., by sequence number of the packets $P_{1-i}$). In other examples, the receiving node(s) 310 identify the missing packet(s) $P_M$ as well as the received packet(s) $P_{1-i}$ such that the feedback node 320 does not need to deduce the missing packets $P_M$. In some configurations, an entity that designs the receiver 300 of the live stream connector designs/designates the feedback node 320, such that upon initiation of the receiver 300, the feedback node 320 does not need to be determined. In other configurations, the receiver 300 includes a leader selector 340 to select the feedback node 320 from nodes of the receiver 300. For example, the leader selector 340 determines the feedback node 320 by executing a leader selection algorithm. The leader selector 340 may execute the leader selection algorithm when the live stream connector and/or the receiver 300 activates or when the receiver 300 dynamically changes. Examples of the receiver 300 dynamically changing include when the receiver 300 consolidates a previously determined feedback node 320 or when the receiver 300 converts the previously determined feedback node 320 into a receiving node 310 to account for changes to the application and/or network 120.

Optionally, the live stream connector of the data transport system 100 provides error correction. Although FIG. 3C depicts the error correction as optional by a dotted box, error correction may be included with any implementation of the live stream connector. Error correction enables an extra reliability option for the live stream connector such that the live stream connector may fix errors due to data losses. In some examples, during initialization of the receiver 300, the receiver 300 generates an error correction buffer 350 (e.g., an FEC buffer 350). Here, the error correction being utilized by the live stream connector is forward error correction (FEC). Forward error correction generally refers to an introduction of redundant data during transmission (i.e. error correcting code of redundant bits). Redundant data refers to complex functions of the original information that may be recognized by the receiver 300. The receiver 300 at the FEC buffer 350 receives a parity packet $P_P$ and checks the parity packet $P_P$ for adherence to the error correcting code. Here, when missing bits occur, the missing bits may be corrected based on the FEC code design. Typically, there are two main categories of FEC codes, classical block codes using hard-decision algorithms and convolutional codes using soft-decision algorithms. Block codes work with fixed size blocks of data while convolution codes work with arbitrary lengths of data. In some examples, the receiver 300 uses a type of block code known as Reed-Solomon error correction. By using Reed-Solomon error correction, the receiver 300, via the FEC buffer 350, may detect errors (e.g., at operation 352) and correct multiple symbol errors and erasures (e.g., at operation 354). At the receiver 300, the parity packet $P_P$ is processed to correct the erasures in a represented window. This error correction may help correct burst errors often experienced in live media streaming. Some other examples of FEC block codes and convolution codes that may be used include Golay, Bose-Chaudhuri-Hocquenghem, Hamming, Viterbi, maximum a posteriori probability (MAP), or Bahl-Cocke-Jelinek-Raviv.

Figure 4:
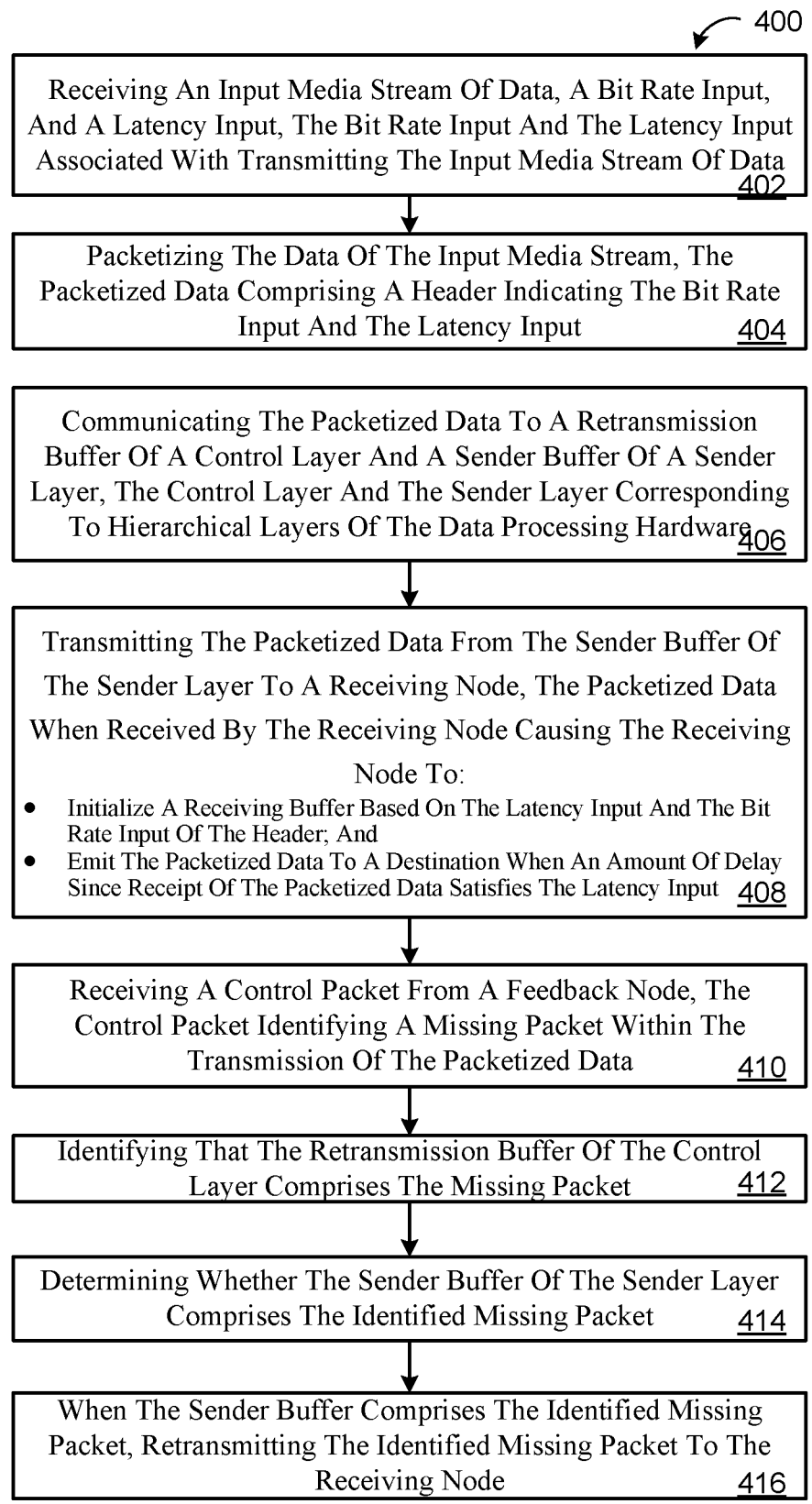
FIGS. 4-6 are flow diagrams of example arrangements of operations for the sender device and the receiver device of the data transport system.
Figure 5:
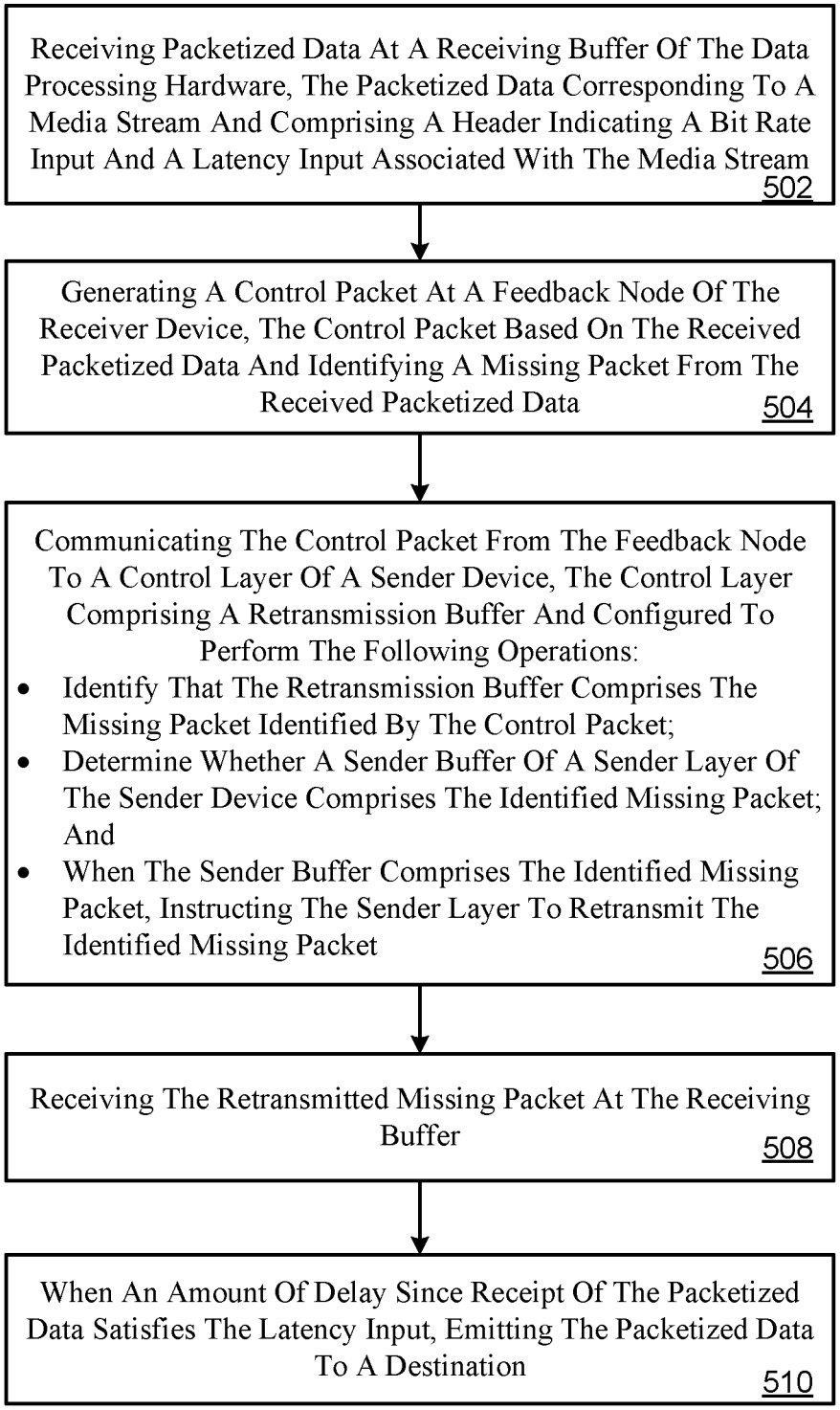
Figure 6:
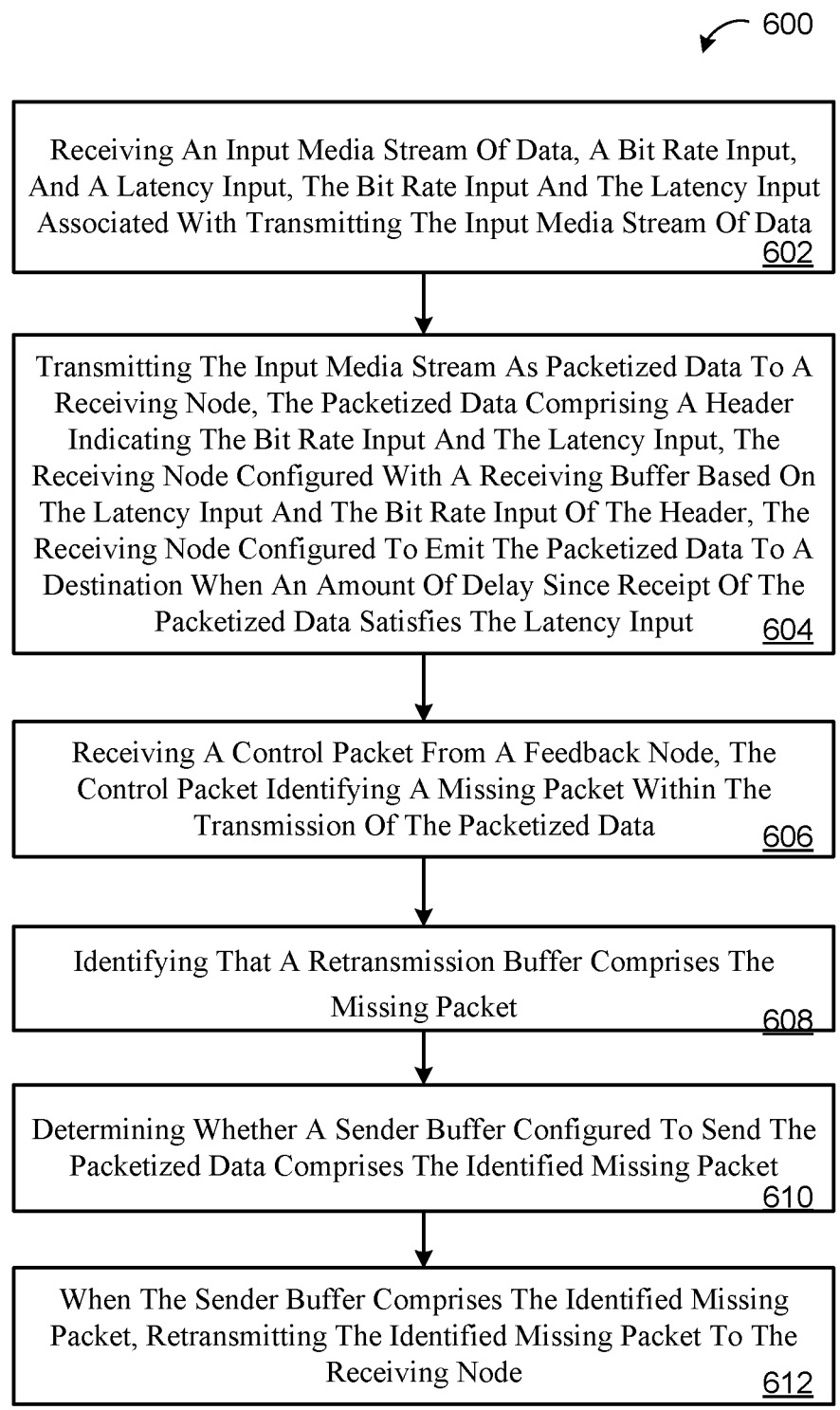

FIGS. 4-6 are flowcharts of example methods 400, 500, and 600 for implementing the live stream connector of the data transport system 100. Referring to FIG. 4, at operation 402, the method 400 receives an input media stream 110 of data, a bit rate input 112a, and a latency input 112b. The bit rate input 112a and the latency input 112b are associated with a transmission of the input media stream 110 of data. At operation 404, the method 400 packetizes the data of the input media stream 110. Here, the packetized data $P_{1-i}$ includes a header 206 indicating the bit rate input 112a and the latency input 112b. At operation 406, the method 400 communicates the packetized data $P_{1-i}$ to a retransmission buffer 212 of a control layer 210 and a sender buffer 222 of a sender layer 220. The control layer 210 and the sender layer 220 correspond to hierarchical layers. For example, hierarchical layers of software utilizing data processing hardware. At operation 408, the method 400 transmits the packetized data $P_{1-i}$ from the sender buffer 222 of the sender layer 220 to a receiving node 310. At operation 408, when the packetized data $P_{1-i}$ is received by the receiving node 310, its receipt causes the receiving node 310 to initialize a receiving buffer 330 based on the latency input 112b and the bit rate input 112a of the header 206 and to emit the packetized data $P_{1-i}$ to a destination when an amount of delay since receipt of the packetized data $P_{1-i}$ satisfies the latency input 112b. At operation 410, the method 400 receives a control packet $P_C$ from a feedback node 320. The control packet $P_C$ identifies a missing packet $P_M$ within the transmission 202 of the packetized data $P_{1-i}$. At operation 412, the method 400 identifies that the retransmission buffer 212 of the control layer 210 includes the missing packet $P_M$. At operation 414, the method 400 determines whether the sender buffer 222 of the sender layer 220 includes the identified missing packet $P_M$. When the sender buffer 222 includes the identified missing packet $P_M$, at operation 416, the method 400 retransmits the identified missing packet $P_M$ to the receiving node 310.

Referring to FIG. 5, at operation 502, the method 500 receives packetized data $P_{1-i}$ at a receiving buffer 330. The packetized data $P_{1\text{-}i}$ corresponds to a media stream 110 and includes a header 206 indicating a bit rate input 112a and a latency input 112b associated with the media stream 110. At operation 504, the method 500 generates a control packet $P_C$ at a feedback node 320 of the receiver device 300. Here, the control packet $P_C$ is based on the received packetized data $P_{1\text{-}i}$ and the control packet $P_C$ identifies a missing packet $P_M$ from the received packetized data $P_{1\text{-}i}$. At operation 506, the method 500 communicates the control packet $P_C$ from the feedback node 320 to a control layer 210 of a sender device 200. The control layer 210 includes a retransmission buffer 212 and the control layer 210 is configured to perform the following operations: identifying that the retransmission buffer 212 includes the missing packet $P_M$ identified by the control packet $P_C$; determining whether a sender buffer 222 of a sender layer 220 of the sender device 200 includes the identified missing packet $P_M$; and when the sender buffer 222 includes the identified missing packet $P_M$, instructing the sender layer 220 to retransmit the identified missing packet $P_M$. At operation 508, the method 500 receives the retransmitted missing packet $P_M$ at the receiving buffer 330. When an amount of delay since receipt of the packetized data $P_{1\text{-}i}$ satisfies the latency input 112b, at operation 510, the method 500 emits the packetized data $P_{1\text{-}i}$ to a destination.

Referring to FIG. 6, at operation 602, the method 600 receives an input media stream 110 of data, a bit rate input 112a, and a latency input 112b. Here, the bit rate input 112a and the latency input 112b are associated with a transmission of the input media stream 110 of data. At operation 604, the method 600 transmits the input media stream 110 as packetized data $P_{1\text{-}i}$ to a receiving node 310. Here, the packetized data $P_{1\text{-}i}$ includes a header 206 that indicates the bit rate input 112a and the latency input 112b. The receiving node 310 is configured with a receiving buffer 330 based on the latency input 112b and the bit rate input 112a of the header 206. The receiving node 310 is also configured to emit the packetized data $P_{1\text{-}i}$ to a destination when an amount of delay since receipt of the packetized data $P_{1\text{-}i}$ satisfies the latency input 112b. At operation 606, the method 600 receives a control packet $P_C$ from a feedback node 320. The control packet $P_C$ identifies a missing packet $P_M$ within the transmission 202 of the packetized data $P_{1\text{-}i}$. At operation 608, the method 600 identifies that a retransmission buffer 212 includes the missing packet $P_M$. At operation 610, the method 600 determines whether a sender buffer 222 is configured to send the packetized data $P_{1\text{-}i}$ includes the identified missing packet $P_M$. When the sender buffer 222 includes the identified missing packet $P_M$, at operation 612, the method 600 retransmits the identified missing packet $P_M$ to the receiving node 310.

Figure 7:
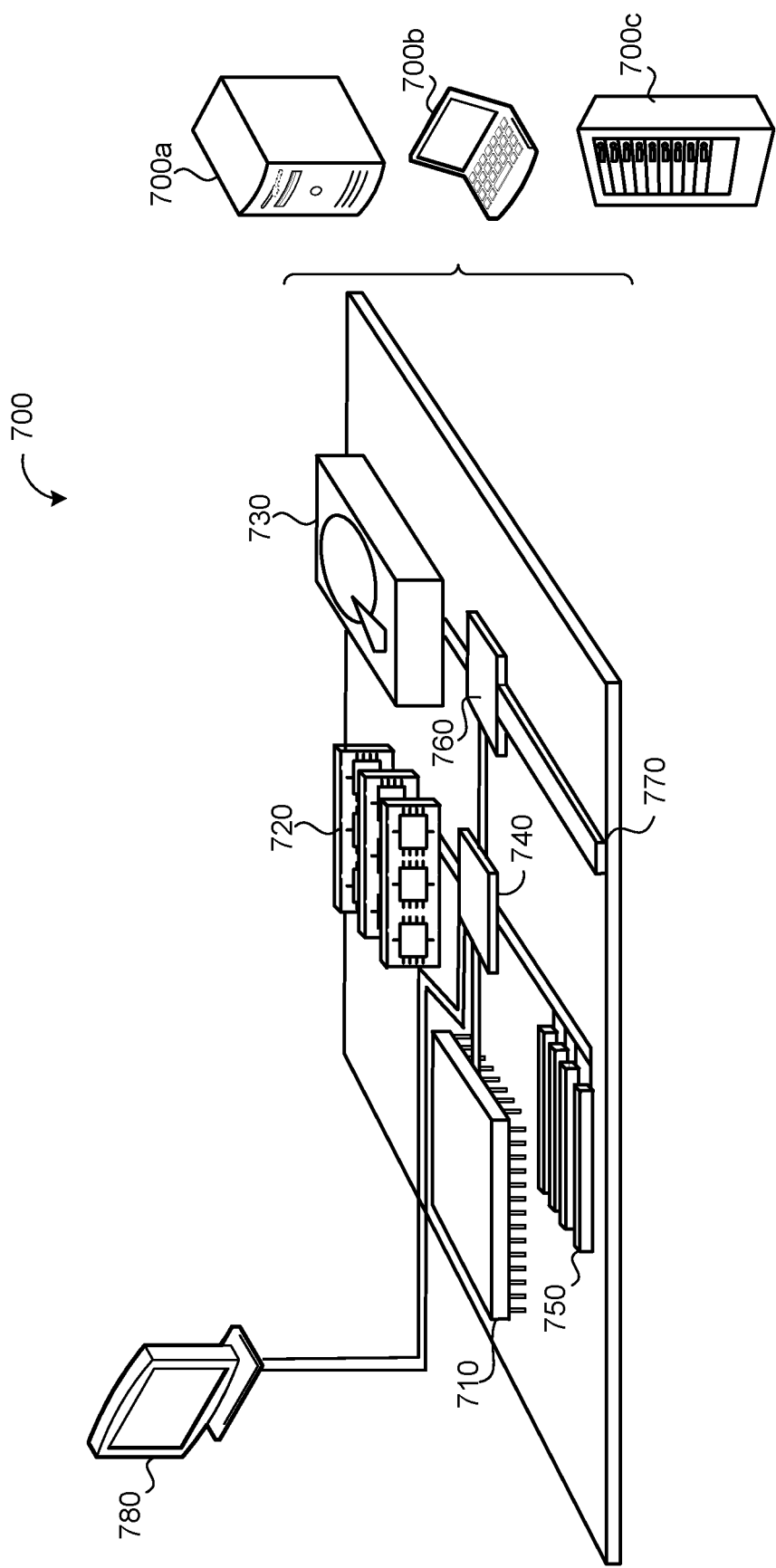
FIG. 7 is a schematic view of an example computing device that may be used to implement the systems and methods described herein.

FIG. 7 is schematic view of an example computing device 700 that may be used to implement the systems (e.g., the sender 200 and the receiver 300 of the live stream connector) and methods (e.g., methods 400, 500, and 600) described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710 (e.g., data processing hardware), memory 720 (e.g., memory hardware), a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware of a sender device, an input media stream of data, a bit rate input, and a latency input, the bit rate input and the latency input associated with transmitting the input media stream of data;
packetizing, by the data processing hardware, the data of the input media stream, the packetized data comprising a header indicating the bit rate input and the latency input;
communicating, by the data processing hardware, the packetized data to a retransmission buffer of a control layer and a sender buffer of a sender layer, the control layer and the sender layer corresponding to hierarchical layers of the data processing hardware;
transmitting, by the data processing hardware, the packetized data from the sender buffer of the sender layer to a receiving node, the packetized data when received by the receiving node causing the receiving node to:
  initialize a receiving buffer based on the latency input and the bit rate input of the header; and
  emit the packetized data to a destination when an amount of delay since receipt of the packetized data satisfies the latency input;
receiving, at the control layer of the data processing hardware, a control packet from a feedback node, the control packet identifying a missing packet within the transmission of the packetized data;
identifying, by the data processing hardware, that the retransmission buffer of the control layer comprises the missing packet;
determining, by the data processing hardware, whether the sender buffer of the sender layer comprises the identified missing packet; and
when the sender buffer comprises the identified missing packet, retransmitting, by the sender layer of the data processing hardware, the identified missing packet to the receiving node.

2. The method of claim 1, wherein each of the retransmission buffer, the sender buffer, and the receiving buffer are dynamically structured based on the bit rate input and the latency input.

3. The method of claim 1, wherein at least one of the retransmission buffer, the sender buffer, or the receiving buffer comprises a circular buffer.

4. The method of claim 1, further comprising, when the sender buffer fails to comprise the identified missing packet:
   writing, by the control layer of the data processing hardware, the identified missing packet to the sender buffer; and
   retransmitting, by the sender layer of the data processing hardware, the identified missing packet from the sender buffer to the receiving node.

5. The method of claim 1, wherein transmitting the packetized data comprises distributing the packetized data to a plurality of receiving nodes.

6. The method of claim 1, wherein the receiving node is further configured to:
   receive a query for the packetized data from an end client at the destination; and
   emit the packetized data based on a query from each node to the end client.

7. The method of claim 1, wherein:
   the control layer and the sender layer of the data processing hardware of the sending device are located at a local broadcaster, and
   the receiving node and the feedback node are located at a remote system remote from the local broadcaster.

8. The method of claim 1, wherein the control layer is configured to perform the following operations:
   manage the retransmission buffer;
   receive the control packet;
   compare the identified missing packet of the control packet to packets of the retransmission buffer;
   write the identified missing packet to the sender buffer; and
   store packet information comprising packet acknowledgments, packet sending timestamps, and packet retransmission timestamps.

9. The method of claim 1, further comprising:
   sending, by the sender layer of the data processing hardware, a round trip time (RTT) ping packet to the receiving node;
   receiving, at the control layer of the data processing hardware, the sent RTT ping packet; and
   generating, by the control layer of the data processing hardware, a round trip time based on the received RTT ping packet.

10. The method of claim 9, wherein retransmitting the identified missing packet to the receiving node further comprises delaying, by the control layer, the retransmission of the identified missing packet to the receiving node by the round trip time.

11. The method of claim 1, wherein the control packet comprises a bitmap structure indicative of a respective received packet and a respective missing packet, the bitmap structure organized from an oldest missing packet to a newest missing packet within a delay window corresponding to the latency input.

12. The method of claim 1, wherein the sender layer is configured to send the packetized data at a send rate equal to the input bit rate.

13. The method of claim 1, wherein the sender layer is configured to send the packetized data at a send rate of about 1.5 to 2.0 times the input bit rate based on a factor of capacity for the sender buffer.

14. The method of claim 1, wherein communicating the packetized data further comprises generating parity packets to send the receiving node for forward error correction.

15. The method of claim 14, wherein transmitting the packetized data from the sender buffer of the sender layer to the receiving node further comprises transmitting the parity packets for forward error correction.

16. A method comprising:
   receiving, at data processing hardware of a receiving node, packetized data at a receiving buffer of the data processing hardware, the packetized data corresponding to a media stream and comprising a header indicating a bit rate input and a latency input associated with the media stream;
   generating, by the data processing hardware, a control packet at a feedback node of the receiver device, the control packet based on the received packetized data and identifying a missing packet from the received packetized data;
   communicating, by the data processing hardware, the control packet from the feedback node to a control layer of a sender device, the control layer comprising a retransmission buffer and configured to perform the following operations:
      identifying that the retransmission buffer comprises the missing packet identified by the control packet;
      determining whether a sender buffer of a sender layer of the sender device comprises the identified missing packet; and
      when the sender buffer comprises the identified missing packet, instructing the sender layer to retransmit the identified missing packet;
   receiving, at the data processing hardware, the retransmitted identified missing packet at the receiving buffer; and
   when an amount of delay since receipt of the packetized data satisfies the latency input, emitting, by the data processing hardware, the packetized data to a destination.

17. The method of claim 16, wherein each of the retransmission buffer, the sender buffer, and the receiving buffer are dynamically structured based on the bit rate input and the latency input.

18. The method of claim 16, wherein at least one of the retransmission buffer, the sender buffer, or the receiving buffer comprises a circular buffer.

19. The method of claim 16, wherein the operations of the control layer further comprise, when the sender buffer fails to comprise the identified missing packet:
   writing the identified missing packet to the sender buffer; and
   instructing a retransmission of the identified missing packet from the sender buffer to the receiving node.

20. The method of claim 16, wherein receiving the packetized data further comprises receiving the packetized data at a plurality of receiving nodes.

21. The method of claim 16, further comprising:
   receiving, at the data processing hardware of the receiving node, a query for the packetized data from an end client at the destination; and
   emitting, by the data processing hardware of the receiving node, the packetized data based on a query from each node to the end client.

22. The method of claim 16, wherein
   the control layer and the sender layer of the sending device are located at a local broadcaster, and
   the receiving node and the feedback node are located at a remote system remote from the local broadcaster and correspond to a receiving device.

23. The method of claim 16, wherein the operations of the control layer further comprise:
  managing the retransmission buffer;
  comparing the identified missing packet of the control packet to packets of the retransmission buffer;
  writing the identified missing packet to the sender buffer; and
  storing packet information comprising packet acknowledgments, packet sending timestamps, and packet retransmission timestamps.

24. The method of claim 16, further comprising:
  receiving, at the data processing hardware, a round trip time (RTT) ping packet from the sender layer at the receiving node, the RTT ping packet configured to determine the round trip time of a packet; and
  sending, by the data processing hardware, the RTT ping packet from the receiving node to the control layer.

25. The method of claim 24, wherein the operations of the control layer further comprise delaying the retransmission of the identified missing packet to the receiving node by the round trip time.

26. The method of claim 16, wherein the control packet comprises a bitmap structure indicative of a respective received packet and a respective missing packet, the bitmap structure organized from an oldest missing packet to a newest missing packet within a delay window corresponding to the latency input.

27. The method of claim 16, wherein the sender layer is configured to send the packetized data at a send rate equal to the input bit rate.

28. The method of claim 16, wherein the sender layer is configured to send the packetized data at a send rate of about 1.5 to 2.0 times the input bit rate based on a factor of capacity of the sender buffer.

29. The method of claim 16, wherein receiving the packetized data further comprises receiving parity packets for forward error correction.

30. A method comprising:
  receiving, at data processing hardware, an input media stream of data, a bit rate input, and a latency input, the bit rate input and the latency input associated with transmitting the input media stream of data;
  transmitting, by the data processing hardware, the input media stream as packetized data to a receiving node, the packetized data comprising a header indicating the bit rate input and the latency input, the receiving node configured with a receiving buffer based on the latency input and the bit rate input of the header, the receiving node configured to emit the packetized data to a destination when an amount of delay since receipt of the packetized data satisfies the latency input;
  receiving, at the data processing hardware, a control packet from a feedback node, the control packet identifying a missing packet within the transmission of the packetized data;
  identifying, by the data processing hardware, that a retransmission buffer comprises the missing packet;
  determining, by the data processing hardware, whether a sender buffer configured to send the packetized data comprises the identified missing packet; and
  when the sender buffer comprises the identified missing packet, retransmitting, by the data processing hardware, the identified missing packet to the receiving node.

* * * * *